(12) United States Patent
Rettore et al.

(10) Patent No.: US 9,371,190 B2
(45) Date of Patent: Jun. 21, 2016

(54) LINK FOR A LATERAL CHAIN FOR CONVEYOR BELTS

(71) Applicant: ALIT S.R.L., Santa Giustina In Colle (IT)

(72) Inventors: Michele Rettore, San Giorgio Delle Pertiche (IT); Nicola Infanti, Tombolo (IT); Mirco Malaman, Piazzola Sul Brenta (IT)

(73) Assignee: ALIT S.R.L. (IT)

( * ) Notice: Subject to any disclaimer, the term of this patent is extended or adjusted under 35 U.S.C. 154(b) by 0 days.

(21) Appl. No.: 14/424,377

(22) PCT Filed: Aug. 20, 2013

(86) PCT No.: PCT/EP2013/067288
§ 371 (c)(1),
(2) Date: Feb. 26, 2015

(87) PCT Pub. No.: WO2014/040827
PCT Pub. Date: Mar. 20, 2014

(65) Prior Publication Data
US 2015/0210477 A1 Jul. 30, 2015

(30) Foreign Application Priority Data
Sep. 14, 2012 (IT) .............................. PD2012A0267

(51) Int. Cl.
*B65G 17/08* (2006.01)
*B65G 17/06* (2006.01)

(52) U.S. Cl.
CPC ............ *B65G 17/083* (2013.01); *B65G 17/063* (2013.01); *B65G 17/064* (2013.01); *B65G 17/086* (2013.01)

(58) Field of Classification Search
CPC .. B65G 17/061; B65G 17/062; B65G 17/063; B65G 17/064; B65G 17/08; B65G 17/083; B65G 17/086; B65G 17/42; B65G 17/44
See application file for complete search history.

(56) References Cited

U.S. PATENT DOCUMENTS

| 5,954,188 A * | 9/1999 | Etherington | B65G 17/063 198/778 |
| 6,874,617 B1 * | 4/2005 | Layne | B65G 17/063 198/779 |
| 7,234,589 B2 * | 6/2007 | Sedlacek | B65G 17/086 198/840 |

(Continued)

FOREIGN PATENT DOCUMENTS

| EP | 0243268 A1 | 10/1987 |
| EP | 1281641 A1 | 2/2003 |

(Continued)

OTHER PUBLICATIONS

International Search Report and Written Opinion issued Oct. 2, 2013 re: Application No. PCT/EP2013/067288; citing: NL 1 018 669 C2, GB 2 008 523 A, EP 2 275 367 A2, EP 1 281 641 A1, EP 2 248 741 A1 and EP 0 243 268 A1.

*Primary Examiner* — Leslie A Nicholson, III
*Assistant Examiner* — Keith R Campbell
(74) *Attorney, Agent, or Firm* — Cantor Colburn LLP

(57) ABSTRACT

A lateral chain link for conveyor belts, particularly for food, includes a substantially U-shaped body wherein the front portion is shaped to be inserted between two facing end parts of a rear portion of a facing identical link. The front portion has two longitudinally extending symmetrical slots for the passage and traverse of an end portion of a first rod-like element of a conveyor belt. The rear portion has an opening on one of its end parts, for inserting an end portion of an additional rod-like element. The outer rear end part has a contoured lateral tab for meshing with a toothed wheel, or belt, of associated entrainment means, and has a lower tipping-preventing side wall. The link is constituted by two parts which are mutually joined with a reversible fixing component: a first part includes the U-shaped body, and the second part includes the lateral tab and lower tipping-preventing side wall.

8 Claims, 4 Drawing Sheets

(56) References Cited

U.S. PATENT DOCUMENTS

| | | | | |
|---|---|---|---|---|
| 7,762,388 B2 * | 7/2010 | Lago | ............... | B65G 17/063 198/778 |
| 7,841,462 B2 * | 11/2010 | Layne | ............... | B65G 17/063 198/778 |
| 8,857,608 B2 * | 10/2014 | Lackner | ............... | B65G 17/08 198/778 |
| 8,899,409 B2 * | 12/2014 | Lasecki | ............... | B65G 17/083 198/844.1 |
| 2010/0282577 A1 * | 11/2010 | Rettore | ............... | B65G 17/064 198/851 |

FOREIGN PATENT DOCUMENTS

| | | |
|---|---|---|
| EP | 2248741 A1 | 11/2010 |
| EP | 2275367 A2 | 1/2011 |
| GB | 2008523 A | 6/1979 |
| NL | 1018669 C2 | 2/2003 |

\* cited by examiner

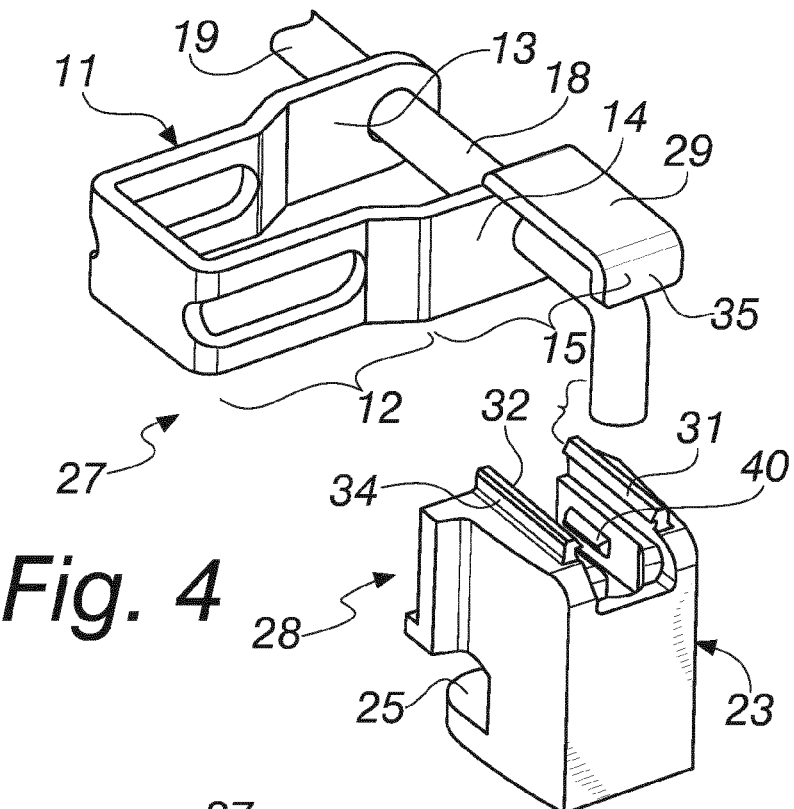
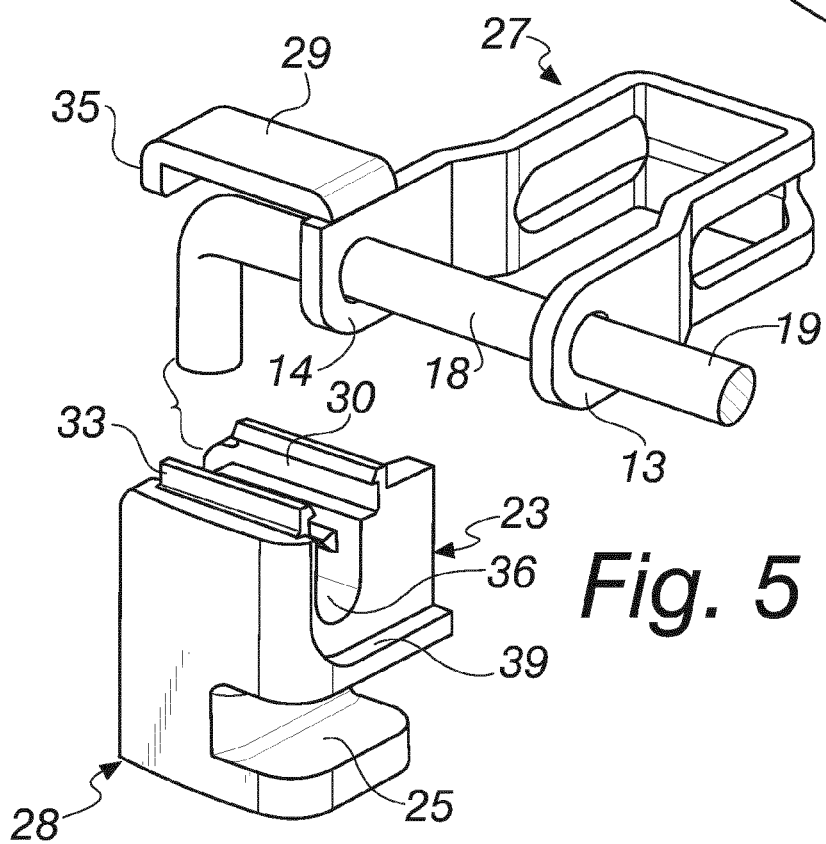

LINK FOR A LATERAL CHAIN FOR CONVEYOR BELTS

FIELD

The present disclosure relates to a link for a lateral chain for conveyor belts.

BACKGROUND

Conventional lateral chain links are known for conveyor belts, particularly for food, which are constituted by a substantially U-shaped body, made either completely of sheet metal, or completely of plastic material, with the front portion shaped so as to be inserted between the two facing end parts of the rear portion of a facing identical link.

The front portion has two longitudinally extending symmetrical slots for the passage and traverse of an end portion of a rod-like element of the conveyor belt of which the chain link is part.

The rear portion has, on each one of its end parts, a hole for the insertion of an end portion of an additional rod-like element.

The outer rear end part has a lateral tab which is contoured to mesh with a toothed wheel, or with a chain, or with a toothed belt, of associated means of entrainment, and furthermore has a lower tipping-preventing side wall, which is adapted to be arranged below the sliding guide of the lateral chain.

A similar link is described and claimed in EP 2248741 B1, in the name of ALIT S. R. L.

Such links, although widespread and appreciated both in the sheet metal version, and in the embodiment made of plastic material, show room for improvement, in both types.

A first drawback is constituted by the fact that both types of links are composed of a single piece.

This implies that when the lateral meshing tab or the tipping-preventing side wall become worn to the point that they compromise the stability of the motion of the conveyor belt, and replacement is necessary, such replacement is highly complex and laborious, requiring the disassembly of a section of the belt, the removal of the link from the end portions of the longitudinal elements, the mounting of the new link and subsequent assembly to the rest of the belt.

Such series of unavoidable operations require time and labor, and involve a wasteful discarding of components, i.e. links, which are unusable owing to the wear of a limited few portions, while they might be intact in the remaining parts.

Moreover, links made of plastic material, for example made of plastic material with a low friction coefficient, have better slideability properties than links made of sheet metal, while links made of sheet metal make it possible to provide conveyor belts that are capable of supporting heavier loads than what can be achieved with links made of plastic material.

Thus, a need exists for a link for a lateral chain for conveyor belts, which, in the event of wear of a portion thereof, allows the rapid and economical restoration of the functionality of the conveyor belt of which it is part.

SUMMARY

Within this aim, an object of the disclosure is to provide a link for a lateral chain for conveyor belts which adds the advantages of links made of sheet metal to those of links made of plastic material.

Another object of the disclosure is to provide a link for a lateral chain for conveyor belts which is structurally simple, easy to use, and can be made at low cost using known systems and technologies.

This aim and these and other objects which will become more evident hereinafter are achieved by a link for a lateral chain for conveyor belts, particularly for food, of the type comprising a substantially U-shaped body in which the front portion is shaped so as to be inserted between the two facing end parts of the rear portion of a facing identical link, said front portion having two longitudinally extending symmetrical slots for the passage and traverse of an end portion of a rod-like element of a conveyor belt, said rear portion having, on each one of said end parts, a hole for the insertion of an end portion of an additional rod-like element, the outer rear end part having a contoured lateral tab and a lower tipping-preventing side wall, said link being characterized in that it is constituted by two parts which are mutually joined with reversible fixing means,
    a first part, which comprises said substantially U-shaped body, with said front portion and with said rear portion,
    and a second part, which comprises said lateral tab and said lower tipping-preventing side wall.

BRIEF DESCRIPTION OF THE DRAWINGS

FIG. 4 is a first exploded perspective view of a link according to the disclosure;

FIG. 5 is a second exploded perspective view of a link according to the disclosure;

DETAILED DESCRIPTION OF THE FIGURES

Figure 1:
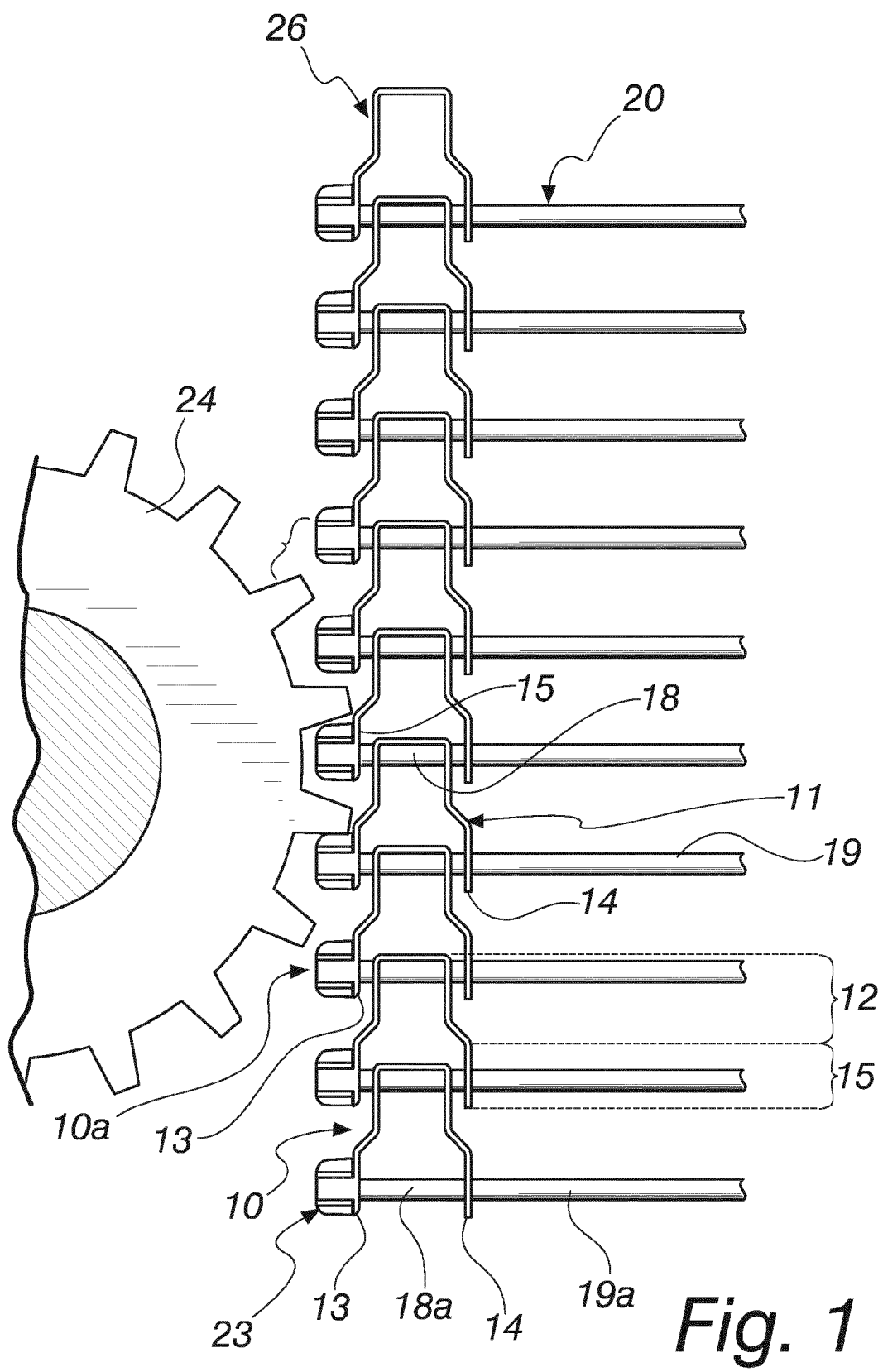
FIG. 1 is a schematic view from above of a conveyor belt with links according to the disclosure.
Figure 2:
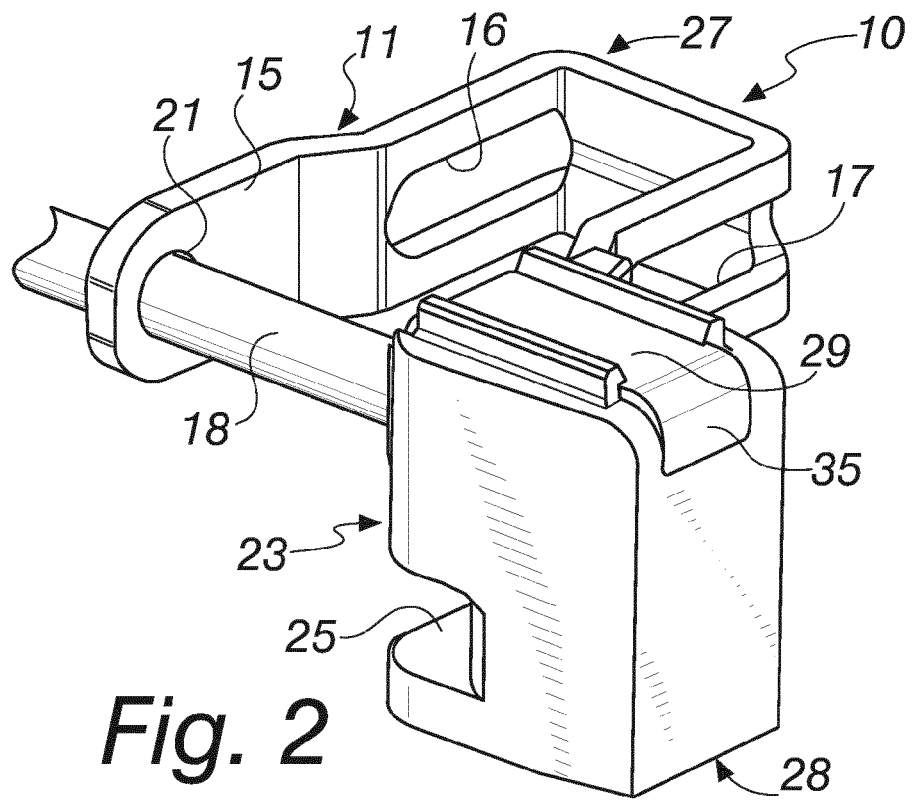
FIG. 2 is a first assembled perspective view of a link according to the disclosure.
Figure 3:
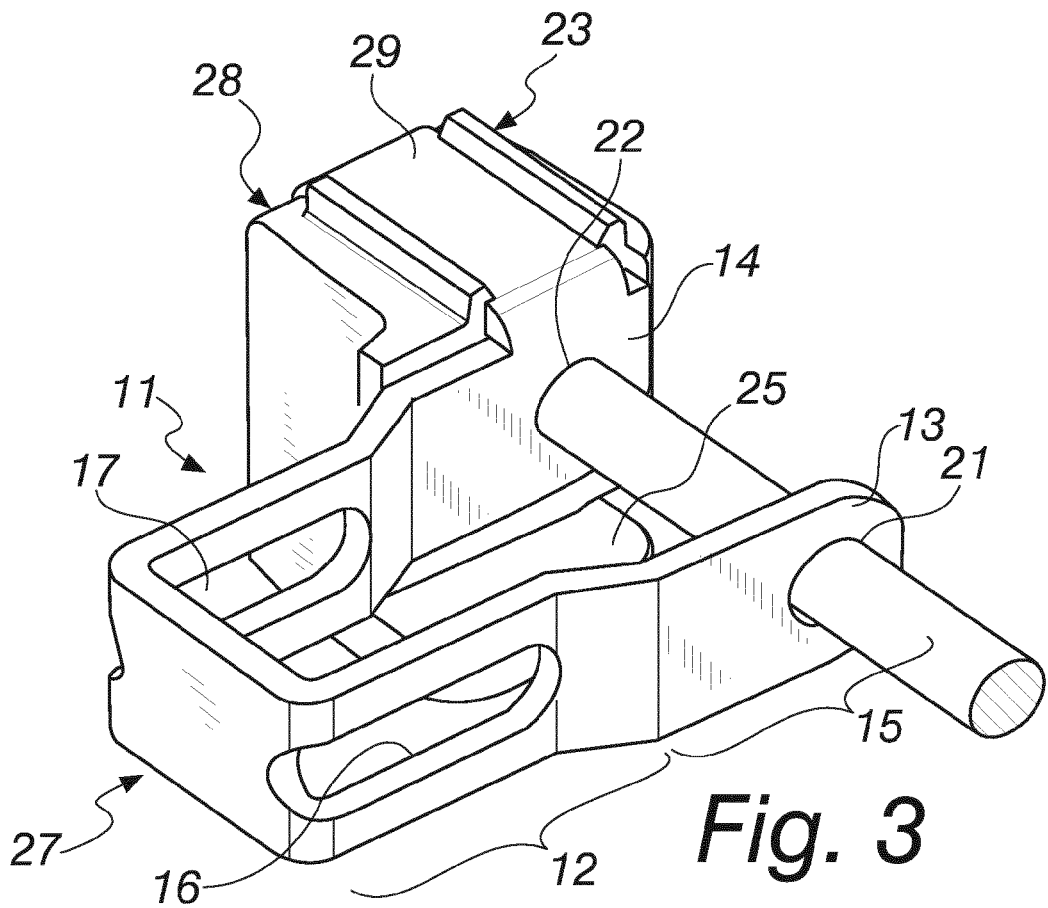
FIG. 3 is a second assembled perspective view of a link according to the disclosure.
Figure 6:
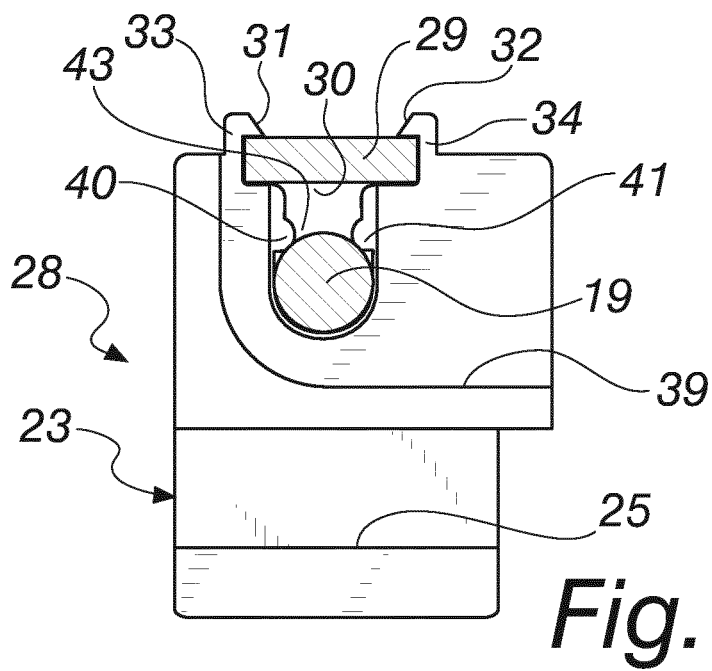
FIG. 6 is a first sectional view of a link according to the disclosure.
Figure 7:
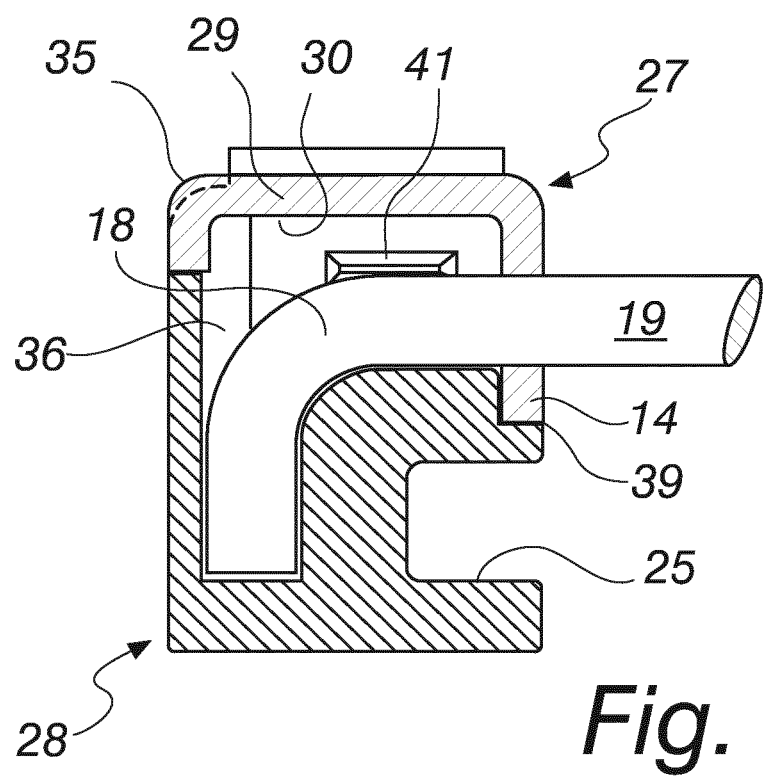
FIG. 7 is a second sectional view of a link according to the disclosure.

With reference to the figures, a link for a lateral chain for conveyor belts is generally designated with the reference numeral 10.

Such a link 10 is of the type comprising a substantially U-shaped body 11, with the front portion 12 shaped so as to be inserted between the two facing end parts 13 and 14 of the rear portion 15 of a facing identical link 10a, as in FIG. 1.

The front portion has two longitudinally extending symmetrical slots, 16 and 17 respectively, for the passage and traverse of an end portion 18 of a rod-like element 19 of a conveyor belt 20.

The rear portion 15 has, on each one of its end parts 13 and 14, a hole, 21 and 22 respectively, for the insertion of an end portion 18a of an additional rod-like element 19a.

The outer rear end part 14 has a lateral tab 23 which is contoured to mesh with a toothed wheel, or chain, or belt 24, of associated means of entrainment, and has a lower tipping-preventing side wall 25, which is adapted to be arranged below the sliding guide of the lateral chain 26.

The link 10 according to the disclosure is constituted by two parts 27 and 28 respectively, clearly visible in FIGS. 2 to 5, which are mutually joined with reversible fixing means, described in more detail hereinbelow:

a first part 27, which comprises the substantially U-shaped body 11, with the front portion 12 and with the rear portion 15, and a second part 28, which comprises the lateral tab 23 and the lower tipping-preventing side wall 25.

The first part 27 is, for example, made of metallic material, and in particular of pressed metal plate.

The second part 28 is preferably made of plastic material, in particular of plastic material with a low friction coefficient.

The reversible fixing means are constituted by a flat wing 29, which protrudes toward the outside of the conveyor belt in the configuration for use and is extended laterally from the outer end part 14 of said rear portion 15.

The flat wing 29 is intended for reversible snap engagement in a corresponding seat 30 formed on the second part 28.

The reversible snap engagement is determined by two mutually opposite engagement teeth 31 and 32, each of which protrudes from an elastically deformable raised portion 33 and 34, with such raised portions 33 and 34 extending from the opposite edges of the seat 30 on the second part 28.

The free end 35 of the flat wing 29 is folded toward the body of the second part 28, so as to prevent the relative movement of the second part 28 toward the outside of the conveyor belt 20 in the configuration for use.

A resting raised portion 39 for the outer end part 14 is formed on the corresponding side of the second part 28 and is shaped substantially complementary to the outer end part.

On the second part 28, at and below the seat 30 for the flat wing 29, there is a second seat 36 for the reversible snap engagement of an end portion 18 of a rod-like element 19 of said conveyor belt 20.

The reversible snap engagement of the end portion 18 in the second seat 36 is provided by two mutually opposite extraction-preventing raised portions 40 and 41 which protrude inward from the walls of the second seat 36 so as to form a passage opening 43 for the end portion 18 of the longitudinal element 19 that has a smaller transverse dimension than the corresponding transverse dimension of said longitudinal element 19.

The end of the end portion 18 is advantageously folded in an L-shape so as to prevent the movement of the longitudinal element 19 along the direction of its main axis; the seat 36 is also substantially L-shaped in order to contain such L-shaped end.

In practice it has been found that the disclosure fully achieves the intended aim and objects.

In particular, with the present disclosure a link for a lateral chain for conveyor belts has been devised which, in the event of wear of a portion thereof, allows the quick and economical restoration of the functionality of the conveyor belt of which it is part, where it is necessary and sufficient to remove the second part 28, which is worn, with a simple manual operation, without performing the more complex disassembly of the first part 27, and then, with a short snap-fitting coupling operation, mount a new second part that is unaffected by wear.

Thus, with the disclosure a link has been devised that gives the link described and claimed in the above-mentioned patent EP 2248741 B1 a greater capacity to resist the tensioning of the conveyor belt of which it is part, and thus higher load capacity, thanks to the first part which is made of pressed sheet metal.

What is more, with the disclosure a link for a lateral chain for conveyor belts is provided which, thanks to its composition of two parts 27 and 28 made of different and dedicated materials, combines the advantages of links made of plastic material, thanks to the second part 28 which is made of plastic material with a low friction coefficient, with the advantages of links made of sheet metal, thanks to the first part 27 which is made of metallic material.

Last but not least, with the disclosure a link for a lateral chain for conveyor belts is provided which is structurally simple, easy to use, and can be made at low cost using known systems and technologies.

The disclosure, thus conceived, is susceptible of numerous modifications and variations, all of which are within the scope of the appended claims. Moreover, all the details may be substituted by other, technically equivalent elements.

In practice the materials employed, and the contingent dimensions and shapes, may be any according to requirements and to the state of the art.

The disclosures in Italian Patent Application No. PD2012A000267 from which this application claims priority are incorporated herein by reference.

Where technical features mentioned in any claim are followed by reference signs, such reference signs have been inserted for the sole purpose of increasing the intelligibility of the claims and accordingly such reference signs do not have any limiting effect on the interpretation of each element identified by way of example by such reference signs.

The invention claimed is:

1. A link of a lateral chain for conveyor belts comprising a substantially U-shaped body in which a front portion is shaped so as to be inserted between first and second facing end parts of a rear portion of a facing identical link, said front portion having first and second longitudinally extending symmetrical slots adapted for the passage and traverse of an end portion of a first rod-like element of a conveyor belt, said rear portion having, on each one of said end parts, an opening adapted for the insertion of an end portion of a second rod-like element, an outer rear end part having a contoured lateral tab adapted to mesh with a toothed wheel, a chain, or a belt of entrainment means, and a lower tipping-preventing side wall adapted to be arranged below a sliding guide of the lateral chain, said link being constituted by first and second parts which are mutually joined with reversible fixing means, a first part made of pressed metal plate, which includes said substantially U-shaped body, with said front portion and said rear portion, and a second part made of plastic material, which includes said lateral tab and said lower tipping-preventing side wall.

2. A link of a lateral chain for conveyor belts comprising a substantially U-shaped body in which a front portion is shaped so as to be inserted between first and second facing end parts of a rear portion of a facing identical link, said front portion having first and second longitudinally extending symmetrical slots for the passage and traverse of an end portion of a first rod-like element of a conveyor belt, said rear portion having, on each one of said end parts, an opening for the insertion of an end portion of a second rod-like element, an outer rear end part having a contoured lateral tab and a lower tipping-preventing side wall, said link being constituted by first and second parts which are mutually joined with reversible fixing means, a first part, which comprises said substantially U-shaped body, with said front portion and said rear portion, and a second part, which includes said lateral tab and said lower tipping-preventing side wall, said reversible fixing means being constituted by a flat wing, which protrudes toward the outside of the conveyor belt in the configuration for use and is extended laterally from an outer end part of said rear portion, said flat wing being configured for reversible snap engagement in a corresponding seat formed on the second part.

3. The link according to claim 2, wherein the reversible snap engagement is determined by first and second mutually opposite engagement teeth, each of which protrudes from an elastically deformable raised portion, said raised portions extending from the opposite edges of said seat on said second part.

4. The link according to claim 2, wherein a free end of said flat wing is folded toward the body of the second part, so as to prevent a relative movement of said second part towards an outside of the conveyor belt in a configuration for use.

5. The link according to claim 2, wherein a resting raised portion for said outer rear end part is formed on a corresponding side of said second part and is shaped substantially complementary to said outer rear end part.

6. The link according to claim 2, wherein on said second part, at and below said seat for said flat wing, there is a second seat for the reversible snap engagement of an end portion of a rod-like element of said conveyor belt.

7. The link according to claim 6, wherein the reversible snap engagement of said end portion in said second seat is provided by two mutually opposite extraction-preventing raised portions which protrude inward from the walls of said second seat so as to form a passage opening for the end portion of the longitudinal element that has a smaller transverse dimension than the corresponding transverse dimension of said longitudinal element.

8. A link of a lateral chain for conveyor belts comprising a substantially U-shaped body in which a front portion is shaped so as to be inserted between first and second facing end parts of a rear portion of a facing identical link, said front portion having first and second longitudinally extending symmetrical slots adapted for the passage and traverse of an end portion of a first rod-like element of a conveyor belt, said rear portion having, on each one of said end parts, an opening adapted for the insertion of an end portion of a second rod-like element, an outer rear end part having a contoured lateral tab adapted to mesh with a toothed wheel, a chain, or a belt of entrainment means, and a lower tipping-preventing side wall adapted to be arranged below a sliding guide of the lateral chain, said link being constituted by first and second parts which are mutually joined with a reversible snap engagement fixing means,
- a first part made of pressed metal plate, which includes said substantially U-shaped body, with said front portion and said rear portion,
- and a second part made of plastic material having a low friction coefficient such that the second part is slideable, the second part including said lateral tab and said lower tipping-preventing side wall.

* * * * *